June 27, 1933.  DE LANCEY W. DAVIS ET AL  1,915,409
LUBRICATED BEARING LINER OR BRASS
Filed Dec. 18, 1931

Inventors
Delancey W. Davis
and John P. Laux
By Brown & Phelps
Attorneys

Patented June 27, 1933

1,915,409

UNITED STATES PATENT OFFICE

DE LANCEY W. DAVIS, OF SAYRE, AND JOHN P. LAUX, OF BETHLEHEM, PENNSYLVANIA

LUBRICATED BEARING LINER OR BRASS

Application filed December 18, 1931. Serial No. 581,962.

The invention relates to bearing liners popularly known in the art as brasses.

An object of the invention is the provision of a brass having means for lubricating the bearing by means of force-feed lubrication.

It is a further object of the invention to provide a brass having a bore provided with means for attachment of a lubricant conduit and grooves in the bearing surface of the liner in communication with said bore.

It is a further object of the invention to provide a brass having lubricant grooves in its surface formed to evenly distribute lubricant over the surface of the bearing.

It is a further object of the invention to provide brasses having lubricant grooves in communication with a conduit formed in the body of the liner adapted for rotation in either direction or for rotation in a particular direction and to evenly distribute lubrication over the surface of the bearing in either instance.

It is a further object of the invention to provide a bearing having lubricant grooves designed to evenly distribute the force-feed lubrication over the surface of the bearing in combination with means to convey lubricant to an end surface of the liner for lubrication of the hub or guard plate.

Further objects of the invention will appear from the following description when read in connection with the accompanying drawing showing an illustrative embodiment of the invention and wherein:—

Figure 1:
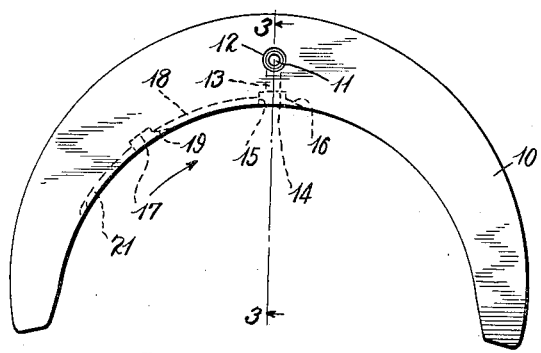
Figure 2:
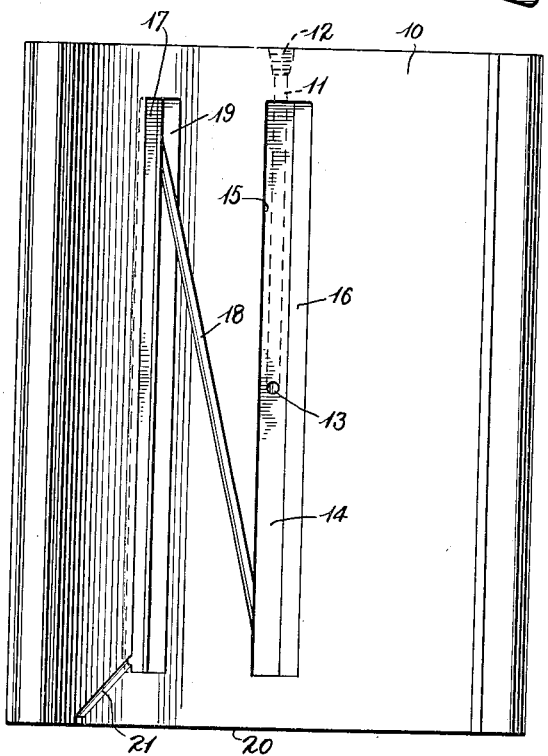
Figure 3:
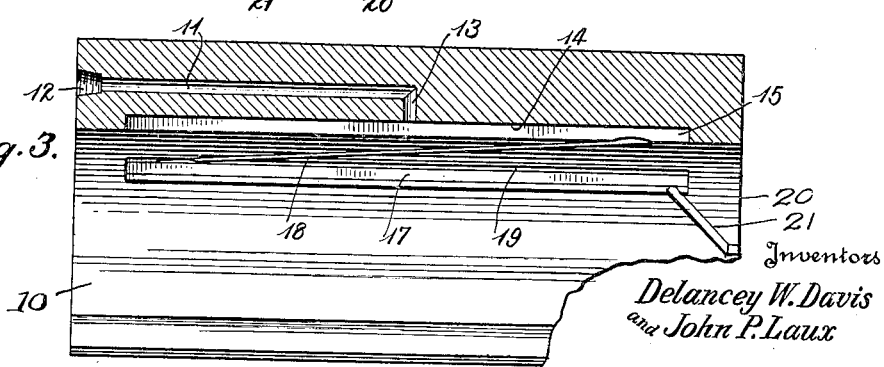

Fig. 1 is an end view;
Fig. 2 is a bottom plan view; and
Fig. 3 is a vertical section on line 3—3 of Fig. 1.

As shown the bearing liner or brass comprises a bearing metal body 10 having a bore 11 shown as opening at 12 to an end surface of the bearing, said opening being internally screwthreaded for attachment of a lubricant delivering conduit. In the form of the invention shown the bore is parallel with the bearing surface and is continued in this direction to substantially the longitudinal center of the bearing, at which point the bore is turned to a vertical portion 13 opening to the bottom of a longitudinal groove 14 in the bearing surface of the liner. The groove 14 is shown as formed with its wall 15 facing the direction of rotation of the journal, indicated by the arrow in Fig. 1, substantially perpendicular to the bearing surface whereas the opposite wall of the groove 16 is shown as tapering toward the wearing surface in order to feed a film of oil to the surface in the direction in which it is carried by rotation of the journal.

Experiments with so much alone of the invention indicate that while the bearing was lubricated in a reasonably satisfactory manner yet improvement could be made in such lubrication and to provide such improvement a second groove 17 is shown parallel with the groove 14 and displaced from the center line of the bearing toward the back edge thereof or in the direction from which the journal rotates toward the groove 14. To conduct lubricant from the groove 14 to the groove 17, there is provided an additional groove 18 shown as diagonal between the groove 14 and 17 and desirably extending from a point adjacent one end of one of the grooves to the opposite end of the remaining groove. The walls of groove 17 are formed in the same manner as those of groove 14, that is to say the wall 19 of the groove 17 is chamfered so as to slope in the direction of rotation of the journal.

To conduct lubricant to an end surface as 20 of the liner, there is shown a groove 21 extending from a point adjacent the end of groove 17 to the end surface of the liner. When the groove 21 is present it is desirable to locate the groove 18 in the manner indicated so that its opening into the groove 17 shall be at the opposite end thereof from the opening of the groove 21 thereinto.

By location of the grooves and lubricant feed as indicated, a journal revolving in the bearing has oil fed to it in the direction counter to its rotation, which oil will be carried around to the lower portion of the bearing which, as is well known, is always slightly spaced from the journal since the weight is borne by the upper brass, and will adhere to the journal to be again carried upwardly between the weight transmitting surfaces, and an effective film of oil will be preserved at all times upon which the weight of the vehicle will float.

Minor changes may be made in the physical embodiments of the invention within the scope of the appended claims without departing from the spirit thereof.

We claim:

1. A bearing liner comprising: a bearing metal body having a bore for reception of lubricant and a plurality of grooves parallel with the bearing axis and closed at their ends, one of said grooves midway between the edges of the liner in communication at its longitudinally central portion with said bore, a second of said grooves spaced from said bore communicating groove counter to the direction of revolution of the journal, a relatively shallow groove extending diagonally from the end of the central groove adjacent the hub plate contacting end of the liner to the opposite end of the spaced groove and a relatively shallow groove extending from the end of the spaced groove adjacent the hub plate contacting end of the liner to said end to lubricate the hub plate.

2. A bearing liner comprising: a bearing metal body having a bore for reception of lubricant and a plurality of grooves parallel with the bearing axis and closed at their ends, one of said grooves midway between the edges of the liner in communication at its longitudinally central portion with said bore, a second of said grooves spaced from said bore communicating groove counter to the direction of revolution of the journal, and a relatively shallow groove extending diagonally from an end of the central groove to the opposite end of the spaced groove.

3. A brass for locomotive bearings comprising, in combination: a semi-cylindrical bearing body; a longitudinal groove in the bearing surface of said body adjacent the back edge thereof; the side of said groove toward said back edge meeting the bearing surface of the body at an abrupt angle to seal said side of the groove by coaction with a journal surface; the remaining side of the groove meeting the bearing surface at an acute angle opening toward the groove; and means to feed lubricant under pressure to said groove.

4. A brass for locomotive bearings comprising, in combination: a semi-cylindrical bearing body; a longitudinal groove in the bearing surface of said body adjacent the back edge thereof; the side of said groove toward said back edge meeting the bearing surface of the body at an abrupt angle to seal said side of the groove by coaction with a journal surface; the remaining side of the groove meeting the bearing surface at an acute angle opening toward the groove; and means to feed lubricant under pressure to said groove in a direction counter to the direction of rotation of the journal.

5. A bearing liner comprising: a bearing metal body having a bore for reception of lubricant and a plurality of grooves substantially parallel with the bearing axis and closed at their ends; one of said grooves approximately midway between the edges of the liner and in communication with said bore, a second of said grooves spaced from said bore communicating groove counter to the direction of revolution of the journal, and a relatively shallow groove extending diagonally from an end of the bore communicating groove to the opposite end of the spaced groove.

DE LANCEY W. DAVIS.
JOHN P. LAUX.